Sept. 24, 1968   G. P. NISSEN ET AL   3,402,952
ADJUSTABLE SUPPORTS FOR GYMNASTIC APPARATUS
Filed Feb. 17, 1966
FIG 2
FIG 1
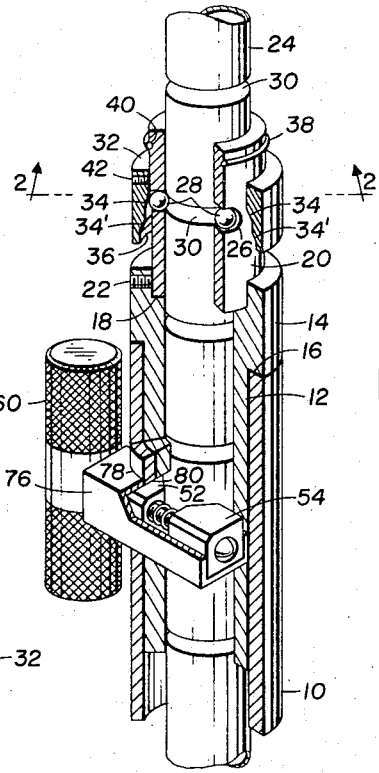
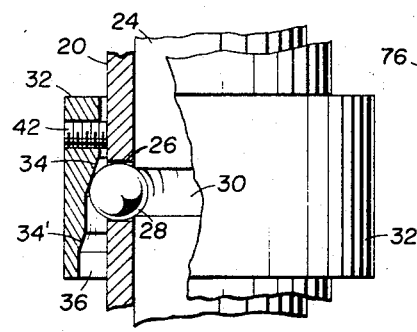
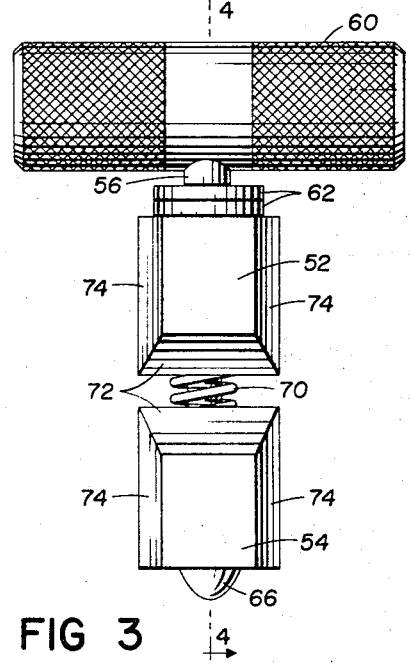
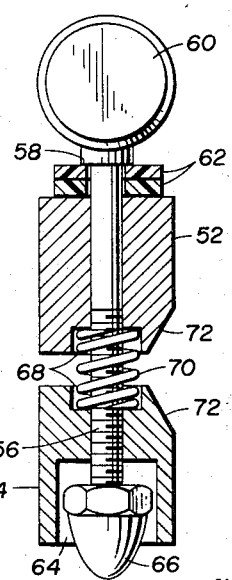
FIG 3
FIG 4
INVENTORS
GEORGE P. NISSEN
EMIL C. STUCKENSCHNEIDER
BY
ATTORNEY

United States Patent Office 3,402,952
Patented Sept. 24, 1968

3,402,952
ADJUSTABLE SUPPORTS FOR GYMNASTIC
APPARATUS
George P. Nissen and Emil C. Stuckenschneider, Cedar
Rapids, Iowa, assignors to Nissen Corporation, Cedar
Rapids, Iowa, a corporation of Iowa
Filed Feb. 17, 1966, Ser. No. 528,221
6 Claims. (Cl. 287—58)

ABSTRACT OF THE DISCLOSURE

An adjusting device for gymnastic apparatus employing upright telescoping members. The invention provides, in addition to the usual lock-up clamp, wholly independent adjusting means for each pair of members which positively maintains their relative telescopic position, even when the lock-up clamp is released, and yet permits quick and ready adjustments thereof over equally spaced intervals. The inner member may be rotated with respect to the outer while their selected telescopic adjustment is maintained. In the preferred form, a series of ball detents carried by the outer column releasably engages one of a number of equally spaced annular grooves in the inner telescoping piston, the detents being so engaged by means of a suitable ramp on a weighted collar axially movable on the column.

Background of the invention

Conventional parallel bars, uneven parallel bars, side and long horses, vaulting bucks and balance beams all incorporate telescoping support members in order that their respective heights may be adjusted as occasions demand. Equal and prescribed increments of movement of the inner telescoping members relative to the outer are usually marked off on the inner members, and some device is normally included to "lock-up" the assembly, as it were, when the desired height has been determined. Locking devices may take many forms, but most currently employ some sort of clamp or vise, or in some cases, a spring loaded pin or lug carried by the outer member and releasably engaging any one of a series of visible, equally spaced holes in the inner member. Where a clamp or vise is used, the markings on inner member often comprise visible scorings or grooves in order to indicate the height at any particular setting, or equal heights where several such supports are present. Sometimes "clicker" devices are also incorporated in order to indicate audibly the intervals of movement of the inner members relative to the outer.

All the foregoing have serious limitations, and indeed substantial disadvantages, in the case of gymnastic apparatus of the kinds mentioned. For instance, the clamp or pin type mechanism, during adjustment of the inner telescoping member, tends to drag thereon and thus disfigure or mar it. This is especially true when the clamp type is used because the tendency is to loosen the clamp only enough to permit relative movement between the members while nevertheless retaining some drag upon the inner so that the apparatus will not collapse of its own weight. If the clamp or pin, as the case may be, is fully released, the upper part of the apparatus must be independently supported throughout the period of adjustment until it is finally locked-up. This is obviously awkward in all cases and especially so in the case of parallel bars when one wishes to adjust not their height but merely the spacing between the bars, which is usually accomplished by rotation of the inner telescoping members. Often the latter inadvertently slip, requiring the height thereafter to be restored. In any event, extra time, effort and care are required to do a proper job. Thus, it is desirable that the means by which the height of the apparatus is adjusted, and in the case of parallel bars also that by which their spacing is varied, be separate from that by which the apparatus is finally "locked-up" ready for use. That is to say, there should be one mechanism which readily permits all necessary adjustments to be made and thereafter maintained until a second, wholly independent mechanism finally secures them. Presently used clamps, pins and other devices suffer, for the reasons indicated, because the same mechanism which provides for adjustment also provides the final lock-up.

Summary of the invention

Accordingly, the broad aspect of the present invention is the provision of a first device by which telescoping support members of the kinds employed in certain gymnastic apparatus may be rigidly locked to each other in combination with a second device permitting quick and easy adjustment of the members when the first device is released, the second device also being effective to maintain such adjustment independently of the first device. A narrower aspect of the present invention is the combination with such support members of a particular type of device permitting such telescoping adjustment and maintenance of the members relative to each other. Briefly described, a preferred form of the invention utilizes an inner cylindrical piston slidably received into the upper end of an outer hollow column, the outer surface of the piston being provided with a series of spaced, circumferential grooves. Each groove is radiused so that a selected one thereof may receive a number of ball detents or checks disposed in a ring of circumferentially spaced apertures in the outer column. The ball detents are retained in engagement with the selected groove by means of a retaining collar having a loose fit over the outer column, the collar being provided with an inner ramp engaging the ball detents and inclined so that the weight of the collar tends to roll the detents up the ramp and force them radially inwardly into the groove. The piston is thus locked to the column against vertical movement relative thereto, yet may be easily rotated therewithin. Raising the collar upwardly permits the ball detents to roll down the ramp as axial movement of the piston forces the detents out of the groove, thus freeing the piston. A separate locking device of the clamp type is also preferably incorporated which rigidly locks the piston to the column once the desired adjustment of the piston has been achieved.

Therefore, when an adjustment is to be made, the clamp may be loosened fully without fear the piston will collapse into the column since it is maintained by the ball detents. The piston may be merely rotated within the column, or may be readily moved up or down by lifting the retaining collar. Since the ball detents readily revolve, no scraping or marring of the piston can occur in either case. Once the desired vertical adjustment is made, the retaining collar is simply released, and immediately, without more, the piston is securely and positively locked to the column against further downward or upward movement. Thus, all adjustments can be made and retained without fear of collapse before the clamps are finally tightened to lock-up the apparatus. Indeed, the apparatus will remain secure even should tightening of a clamp be overlooked, another advantage of the present invention and one of especial importance during competitive and other use of the apparatus when it sometimes happens a clamp is incompletely tightened.

Other features and advantages of the invention will be apparent from the following detailed description of a preferred form thereof, being the best mode contemplated

Brief description of the drawing

FIGURE 1 is a perspective view, partially broken away, of two telescoping support members, typical of those employed in gymnastic apparatus of the kind concerned, with adjusting and locking mechanisms incorporated therein in accordance with the invention;

FIGURE 2 is an enlarged view, partly in section, taken along the line 2—2 of FIGURE 1;

FIGURE 3 is a side view of the lower clamp by which the members are finally locked-up; and FIGURE 4 is a sectional view taken along the line 3–4 of FIGURE 3.

Description of the preferred embodiment

Referring first to FIGURE 1 in particular, there is illustrated a portion of a hollow supporting column 10 of a type typically employed in gymnastic apparatus of the kinds concerned. The specific form of adjusting assembly incorporated therein comprises a long internal sleeve 12 tightly fitted into the upper end portion of column 10. The supper end of sleeve 12 is formed with an enlarged head 14 provided with a lower shoulder 16 seating on the upper end of column 10. The upper end of head 14 of sleeve 12 is counterbored to provide an annular recess 18 which receives in turn a bushing 20 secured by a set screw 22 or other suitable means. The internal diameters of sleeve 12 and bushing 20 are equal and provide a bearing for a telescoping piston 24 to whose upper end is attached the bar, beam, horse, or buck according to the particular apparatus concerned. Since such apparatus is otherwise well known, there is no need to describe or illustrate it further.

The central portion of bushing 20 is provided with a ring of circumferentially spaced apertures 26, of greater diameter than the wall thickness of bushing 20, in which are freely seated ball checks or detents 28. The latter are engageable with any one of a series of spaced, circumferential grooves 30 along piston 24. The depth and radius of grooves 30 are effective to allow a portion of each ball detent 28 to protrude thereinto from the inner surface of bushing 20 and yet at the same time to have a portion diametrically opposite thereto protrude beyond the outer surface of bushing 20 owing to the fact that the diameter of ball detents 28 is greater than the wall thickness of bushing 20. The ball detents 28 are normally maintained in engagement with a particular groove 30 by means of a retaining collar 32 that loosely encircles bushing 20 and is axially movable upwardly with respect thereto. The central portion of the inner periphery of collar 32 is provided with a downwardly and outwardly inclined annular ramp 34 engaging the outwardly protruding portions of ball detents 28 when seated in the groove 30. The inner portion of collar 32 below ramp 34 is gradually enlarged by, in effect, a lower offset continuation 34' of ramp 34 in order to provide an annular chamber 36 of sufficient size between bushing 20 and the lower end of collar 32 to permit outward radial movement of ball detents 28, owing to the weight of piston 24 when collar 32 is lifted, enough to withdraw them entirely from the groove 30. In order to limit upward movement of collar 32 so that ball detents 28 will not escape from bushing 20, the upper end of the latter is preferably fitted with a snap ring 38 seated in a suitable groove 40 which engages a set screw 42 in the upper end of collar 32 before the latter can be removed enough to uncover ball detents 28.

Collar 32 and the incline of ramp 34 must obviously be effective to maintain ball detents 28 in engagement with the groove 30, despite the weight or other force on piston 24, in order to secure the latter against telescoping movement relative to column 10. For this purpose it will readily be apparent that the components must be chosen and sized so that the movement of ball detents 28 into engagement with a groove 30 by means of the weight of collar 32 and ramp 34 is nonreversible, at least with respect to any practical axial load upon piston 24. As a specific example, a retaining collar weighing 9 ounces and having a ramp angle of 20 degrees with respect to its axis will securely maintain six ball detents of 3/8" diameter in engagement with a groove of a depth of 3/64" in a piston of 1 5/8" diameter. In any event, those skilled in the art will be readily able to determine the various sizes required in any particular case.

The independent lock-up assembly is of the clamp or vise type and employs a pair of generally rectangular, substantially identical wedge blocks 52 and 54 disposed in spaced end-to-end relation. Wedge blocks 52 and 54 are align bored centrally therethrough to receive a bolt 56 shouldered at 58 at one end, its other end threadedly engaging wedge block 54 only, and fitted at its shouldered end with a T-handle 60 having a knurled gripping surface. A pair of synthetic washers 62 are disposed between the shoulder 58 of bolt 56 and the outer end of wedge block 52, and the outer end of wedge block 54 is counterbored at 64 to receive an acorn nut 66 fixed to the threaded end of bolt 56. The adjacent inner ends of wedge blocks 52 and 54 are also counterbored at 68 to receive the opposite ends of a helical spring 70 effective to bias wedge blocks 52 and 54 apart. Finally, an opposite pair of edges of the adjacent inner ends of wedge blocks 52 and 54 are beveled to provide wedge faces 72 at angles such that the midportions of wedge faces 72 are simultaneously tangent to the surface of a cylinder the diameter of piston 24 when wedge blocks 52 and 54 are drawn closely adjacent each other by bolt 56. Preferably, the edges of wedge blocks 52 and 54 adjacent wedge faces 72 are also beveled as at 74.

The foregoing assembly is slidably fitted in an open-ended, U-shaped housing 76 mounted to the side of column 10 transversely thereof between the head 14 of sleeve 12 and the lower end of the latter. The two edges of the open side of housing 76 are arcuately relieved at 78 in order to fit against column 10 and welded thereto, wedge faces 72 engaging piston 24 through a rectangular, circumferentially extending aperture 80 through column 10 and sleeve 12 when bolt 56 is turned up against spring 70. Piston 24 is thus clamped securely between sleeve 12 and wedge blocks 52 and 54, the acorn nut 66 merely serving to prevent bolt 56 being turned out so far it disengages wedge block 54.

Accordingly, as noted before, owing to the adjusting assembly, the lock-up assembly may be fully loosened without danger of piston 24 collapsing within column 10, even with the weight of a performer on the apparatus, yet at the same time piston 24 can freely be rotably adjusted within column 10 on ball detents 28. Moreover, as is obvious, the ball detents 28 additionally prevent movement of piston 24 under the circumstances when the performer's motions, as often happens, imposes an upward force upon piston 24, thus providing a still further and desirable safety feature. Lifting of collar 32 also frees piston 24 for vertical adjustment. Indeed, in this connection, it has been found in practice that merely the weight of the apparatus wedges ball detents 28 between groove 30 and ramp 34 enough so that an effort somewhat more than would otherwise be required to lift collar 32 must be used in order to free ball detents 28 and thus piston 24 for axial movement. This is all to the good because it largely prevents an accidental blow or jostling from disturbing collar 32 enough to collapse the apparatus. Finally, the adjusting assembly adds no substantial bulk or weight to the apparatus, nor any projections constituting a hazard to performers, and may be easily adapted to apparatus not initially equipped therewith.

Though the invention has been described in terms of particular mechanisms, it is not limited thereto. Its broad aspect, as stated before, is independent of the particular means employed, both for adjustment as well as for lock-up. Therefore, the following claims are to be read as encompassing all variations and modifications falling within the scope of the invention as stated.

We claim:

1. In gymnastic apparatus employing one or more pairs of upright inner and outer telescoping members, said outer member being fixed and said inner member being rotatable relative thereto, the combination therewith of first means releasably securing said members rigidly to each other against any movement relative thereto and second means releasable to permit telescoping movement of said members to any one of a plurality of selected positions when said first means is also released, said second means, when said first means is released and said second means is unreleased being effective both to permit said rotatable movement of said members relative to each other and to maintain said members in one of said selected positions when a force in either axial direction is imposed upon said inner member.

2. The combination of claim 1 wherein said second means includes a plurality of detent means carried by said outer member and releasably engageable with said inner member to prevent telescoping movement only of said members, and retaining means carried by said outer member releasably urging said detent means into engagement with said inner member.

3. The combination of claim 2 wherein said detent means comprise ball checks rotatably disposed in a ring of circumferentially spaced apertures through said outer member and radially movable therein with respect to said members in opposite directions in order to selectively engage or disengage a selected one of a plurality of axially spaced circumferential grooves in the outer surface of said inner member, each of said grooves being effective to prevent telescoping movement while permitting rotatable movement of said inner member when said ball checks are in engagement with said groove.

4. The combination of claim 3 wherein said retaining means comprises a collar encircling said outer member, said collar being axially movable between two positions on said outer member and including an annular ramp inclined with respect to the axis of said collar, said collar and ramp being effective to engage and maintain said ball checks in engagement with said groove against displacement therefrom by axial loads on said inner member when said collar is in one of said positions, and to permit said ball checks to disengage said grooves when said collar is in the other of said positions, said collar being biased by its weight to said first named position thereof.

5. The combination of claim 4 wherein said outer member includes an inner sleeve fixed within the top portion thereof and in slidable contact with said piston, the portion of said outer member below said sleeve spacedly encompassing said piston, said sleeve having an exposed portion extending above the upper end of said outer member, said ball checks and said collar being located on said exposed sleeve portion.

6. The combination of claim 5 wherein said first means includes a pair of wedge blocks having a pair of opposed end portions spaced from each other and carried in a housing fixed to said outer member along the portion thereof containing said sleeve, each of said blocks being slidably movable in said housing transversely with respect to said outer member and linearly with respect to each other effective to vary the spacing between said end portions thereof, and means engaging each of said blocks effective to adjust said spacing therebetween, said blocks having a pair of cooperating wedge faces on said end portions thereof disposed in opposed relation to each other and to said inner member through an aperture in said outer member and sleeve, said wedge faces being effective to releasably engage the outer surface of said inner member through said aperture and wedge said piston against said sleeve when the spacing between said end portions of said blocks is decreased by said adjusting means.

References Cited

UNITED STATES PATENTS

| 2,705,119 | 3/1955 | Ingwer. | |
| 3,120,386 | 2/1964 | Janssen | 272—63 |
| 3,147,829 | 9/1964 | Johnson et al. | |
| 3,171,627 | 3/1965 | Tapley et al. | |
| 3,232,609 | 2/1966 | Nissen et al. | 272—63 |
| 3,312,487 | 4/1967 | McIntyre. | |

CARL W. TOMLIN, *Primary Examiner.*

W. L. SHEDD, *Assistant Examiner.*